US011221030B2

(12) United States Patent
Rhein et al.

(10) Patent No.: US 11,221,030 B2
(45) Date of Patent: Jan. 11, 2022

(54) FASTENING SYSTEM

(71) Applicant: A. RAYMOND ET CIE, Grenoble (FR)

(72) Inventors: Axel Rhein, Steinen (DE); Thomas Eckert, Bad Säckingen (DE); Florian Herrbach, Triembach-Au-Val (FR)

(73) Assignee: A. Raymond et Cie, Grenoble (FR)

( * ) Notice: Subject to any disclaimer, the term of this patent is extended or adjusted under 35 U.S.C. 154(b) by 0 days.

(21) Appl. No.: 16/615,648

(22) PCT Filed: May 17, 2018

(86) PCT No.: PCT/EP2018/062881
§ 371 (c)(1),
(2) Date: Feb. 4, 2020

(87) PCT Pub. No.: WO2018/215279
PCT Pub. Date: Nov. 29, 2018

(65) Prior Publication Data
US 2020/0166062 A1 May 28, 2020

(30) Foreign Application Priority Data
May 22, 2017 (DE) .......................... 102017004874.6

(51) Int. Cl.
*F16B 2/24* (2006.01)
*F16B 21/07* (2006.01)
*B60R 19/52* (2006.01)

(52) U.S. Cl.
CPC .............. *F16B 2/245* (2013.01); *F16B 2/248* (2013.01); *F16B 21/073* (2013.01); *B60R 19/52* (2013.01); *F16B 2200/10* (2018.08)

(58) Field of Classification Search
CPC ..... Y10T 24/30; Y10T 24/306; Y10T 24/307; Y10T 24/308; Y10T 24/309;
(Continued)

(56) References Cited

U.S. PATENT DOCUMENTS 444,019 A * 1/1891 Richards ................... E05F 5/06
292/17
2,079,648 A 5/1937 Aldeen et al.
(Continued)

FOREIGN PATENT DOCUMENTS

DE 102008052966 A1 4/2010
DE 102012210193 A1 12/2012
(Continued)

OTHER PUBLICATIONS

English translation of International Search Report for PCT/EP2018/062881 dated Jul. 31, 2018, 3 pages.
(Continued)

*Primary Examiner* — Robert Sandy
*Assistant Examiner* — Michael S Lee
(74) *Attorney, Agent, or Firm* — Warner Norcross + Judd LLP

(57) ABSTRACT

The invention relates to a device for holding a head of a pin of a component, said device having a receiving space which defines an opening via which the head of the pin can be inserted; a spring element disposed in the receiving space; and a path limiter which is disposed in the receiving space. The spring element has a receptacle for the head of the pin of the component, and the straight line which connects the geometric center point of the opening to the geometric center point of the receptacle forms a reference line. A curved or bent receiving section of a spring arm of the spring element is provided as part of the receptacle. The receiving section has at least one distance point which is arranged furthest from the reference line than other points along the extension of the curved or bent receiving section.

11 Claims, 6 Drawing Sheets

(58) Field of Classification Search
CPC .. Y10T 292/0817; F16B 2/245; E05C 19/063; E05C 19/066
See application file for complete search history.

(56) References Cited

U.S. PATENT DOCUMENTS

| | | | | |
|---|---|---|---|---|
| 3,103,378 | A * | 9/1963 | Axelw | E05C 19/066 292/17 |
| 3,132,727 | A * | 5/1964 | Meulenberg | F16B 5/128 52/718.07 |
| 3,759,555 | A | 9/1973 | Ito | |
| 4,881,764 | A | 11/1989 | Takahashi et al. | |
| 5,002,319 | A * | 3/1991 | Chandler | E05C 19/063 292/17 |
| 2005/0225094 | A1* | 10/2005 | Lewis | E05C 19/066 292/19 |
| 2011/0250037 | A1 | 10/2011 | Schmitz et al. | |
| 2012/0324795 | A1 | 12/2012 | Krajenke et al. | |

FOREIGN PATENT DOCUMENTS

| | | |
|---|---|---|
| DE | 202013006149 U1 | 10/2014 |
| EP | 3156668 A1 | 4/2017 |
| JP | H08128415 A | 5/1996 |
| JP | 2007161139 A | 6/2007 |
| LU | 45727 A | 5/1964 |

OTHER PUBLICATIONS

Machine assisted English translation of JPH08128415A obtained from https://patents.google.com on Nov. 21, 2018, 4 pages.
Machine assisted English translation of DE102008052966A1 obtained from https://patents.google.com on Nov. 21, 2018, 7 pages.
Machine assisted English translation of DE202013006149U1 obtained from https://patents.google.com/patent on Mar. 26, 2021, 8 pages.
Machine assisted English translation of JP2007161139A obtained from https://patents.google.com/patent on Mar. 26, 2021, 7 pages.

* cited by examiner

FASTENING SYSTEM

CROSS-REFERENCE TO RELATED APPLICATIONS

This application is the National Stage of International Application No. PCT/EP2018/062881, filed on 17 May 2018, which claims priority to and all advantages of German Patent Application No. 102017004874.6, filed on 22 May 2017, the content of which is hereby incorporated by reference.

FIELD OF THE INVENTION

The invention relates to a device for holding a head arranged on a component. The invention further relates to a spring element which can be used in such a device. The invention further relates to a system comprising such a device and a component comprising a head. Lastly, the invention relates to a method for pulling out the head and to the use of the device, of the spring element or of the system for carrying out the method.

BACKGROUND OF THE INVENTION

In vehicles, it is necessary to connect various components, some of which are mounted on the frame of the vehicle or on other supporting elements. The components can be cladding elements, elements of the drive unit or of the chassis, for example. The mounting of cladding elements, which detach in the event of excessive stress, for example in the event of an accident, is necessary, in particular in the front region. This can result in a reduction of injuries, in particular of pedestrians. At the same time, however, there is a need to optimize the driving characteristics of a vehicle with the aid of add-on parts, which must be held securely on the vehicle even under the pressures acting on the front of the vehicle when driving at high speeds.

JP 8128415 A2 discloses a holder for fastening components by way of an elongated cylindrical retaining element, in particular in the form of pipes and/or cables, on a vehicle body or a vehicle chassis, in which retaining elements are provided two sides which are bendably connected to one another and between which a connecting means acts so as to hold two opposing clamping sections, one of which can also be part of a body. The shape of the bendable element is designed in such a way that engagement or detachment of the cylindrical component is only made possible above a certain force.

LU 45727 A likewise discloses a holder for fastening cylindrical components, in particular cables, wherein the holder comprises two spring arms, which are circular in some sections and in which a component can engage. This holder also requires a certain force or limit force for engaging or detaching the cylindrical component. A cover for locking is provided so as to increase the retaining force and to prevent or impede detachment of the component from the spring arms. A disadvantage of the described holders is that they frequently do not allow permanently stable fastening with respect to vibrations and minor to moderate impact. In addition, the holding forces are relatively limited so that it is not possible to hold larger and/or heavier components. Typically, the force for releasing the fastening can only be increased by way of stronger spring arms, which, however, leads to an increased force for engagement. Furthermore, the aforementioned holders offer only inadequate options for guiding into an engaged position. LU 45727 A only allows an increase in the retaining force via a cover element, which has to be additionally mounted.

BRIEF SUMMARY OF THE INVENTION

The invention comprises individual elements for a system comprising a component including a head, which allow the head to be held securely in a receptacle up to a defined tensile force but at the same time makes it possible to reliably detach the head from the receptacle with increased tensile forces, while also allowing to easily insert the head into the receptacle during assembly of the system.

The core of the invention is to design the spring element according to the invention so as to allow easy insertion of the head by freely pivoting back, to the extent necessary for insertion of the head, a blocking section and a receiving section which forms part of the receptacle and has a curved or bent design, while the blocking section closing the receptacle in the pull-out direction of the head blocks the head from being pulled out up to an elastic, or a plastic, deformation of the blocking section.

BRIEF DESCRIPTION OF THE DRAWINGS

The invention is described in greater detail below with reference to the accompanying Figures, in which.

DETAILED DESCRIPTION

Figure 1:
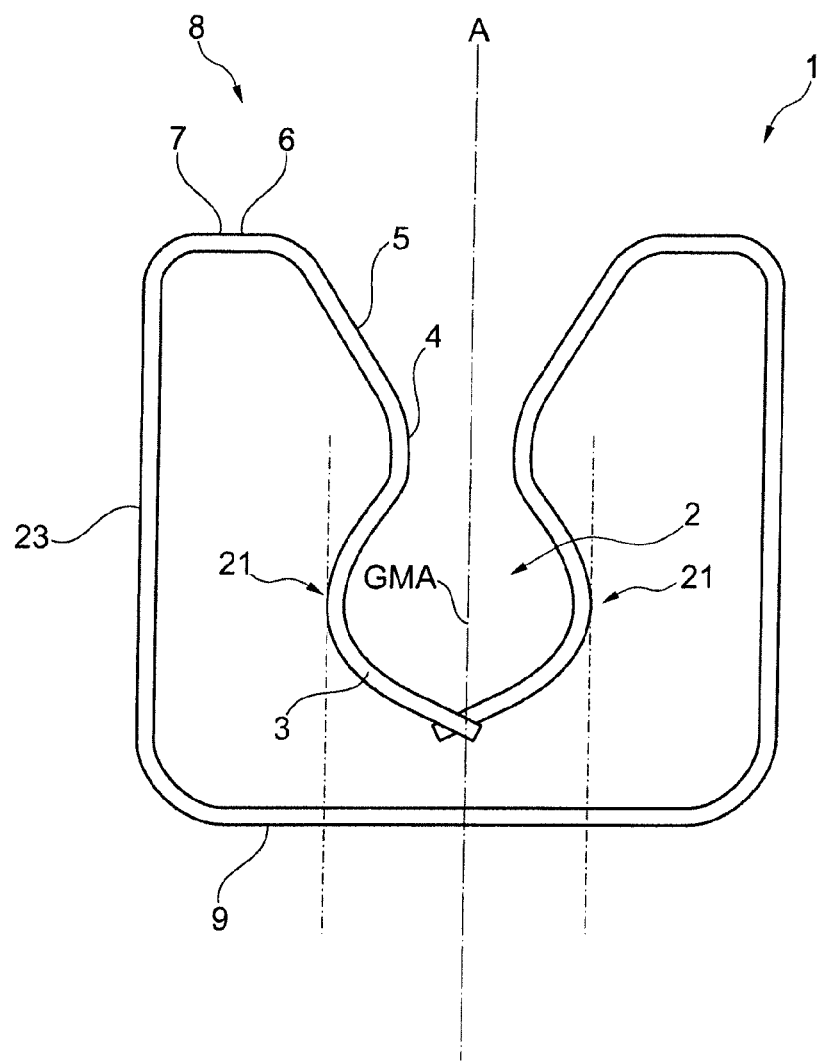
FIG. 1 shows a plan view of a spring element according to the invention.
Figure 2:
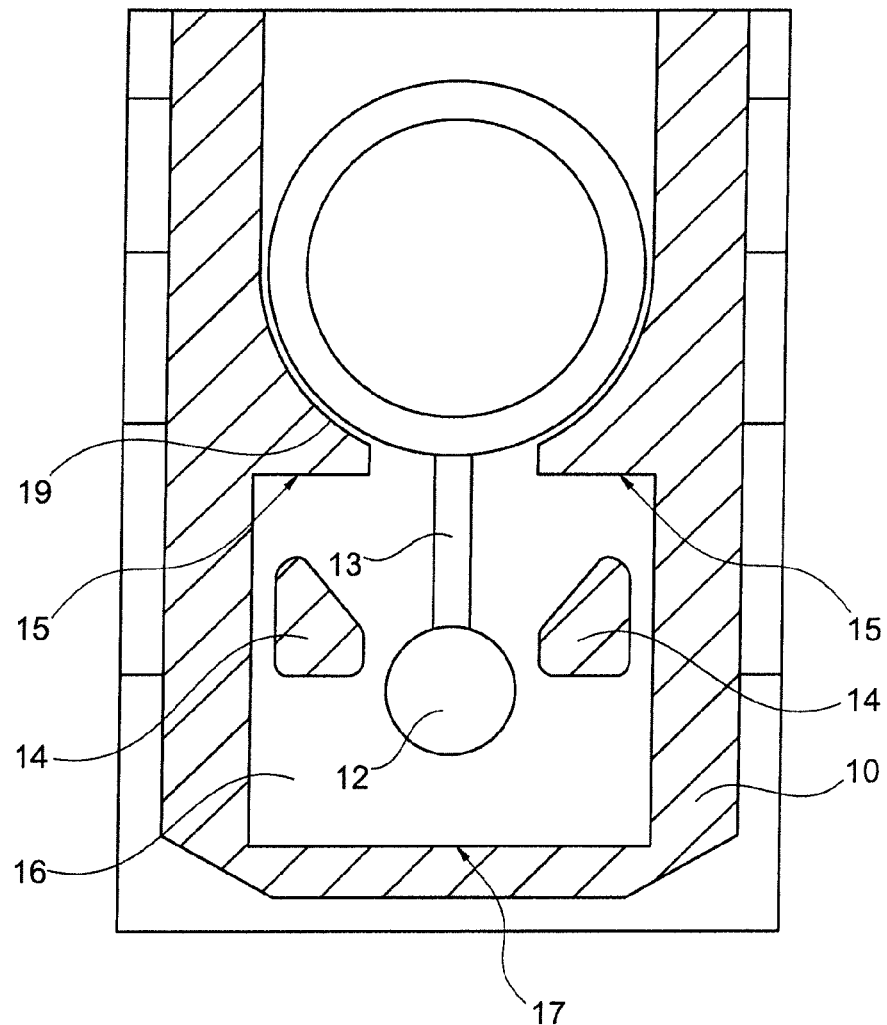
FIG. 2 shows a plan view of a head of a pin of a component of a system according to the invention, which is inserted into the receiving space of a device shown without a spring element.
Figure 3:
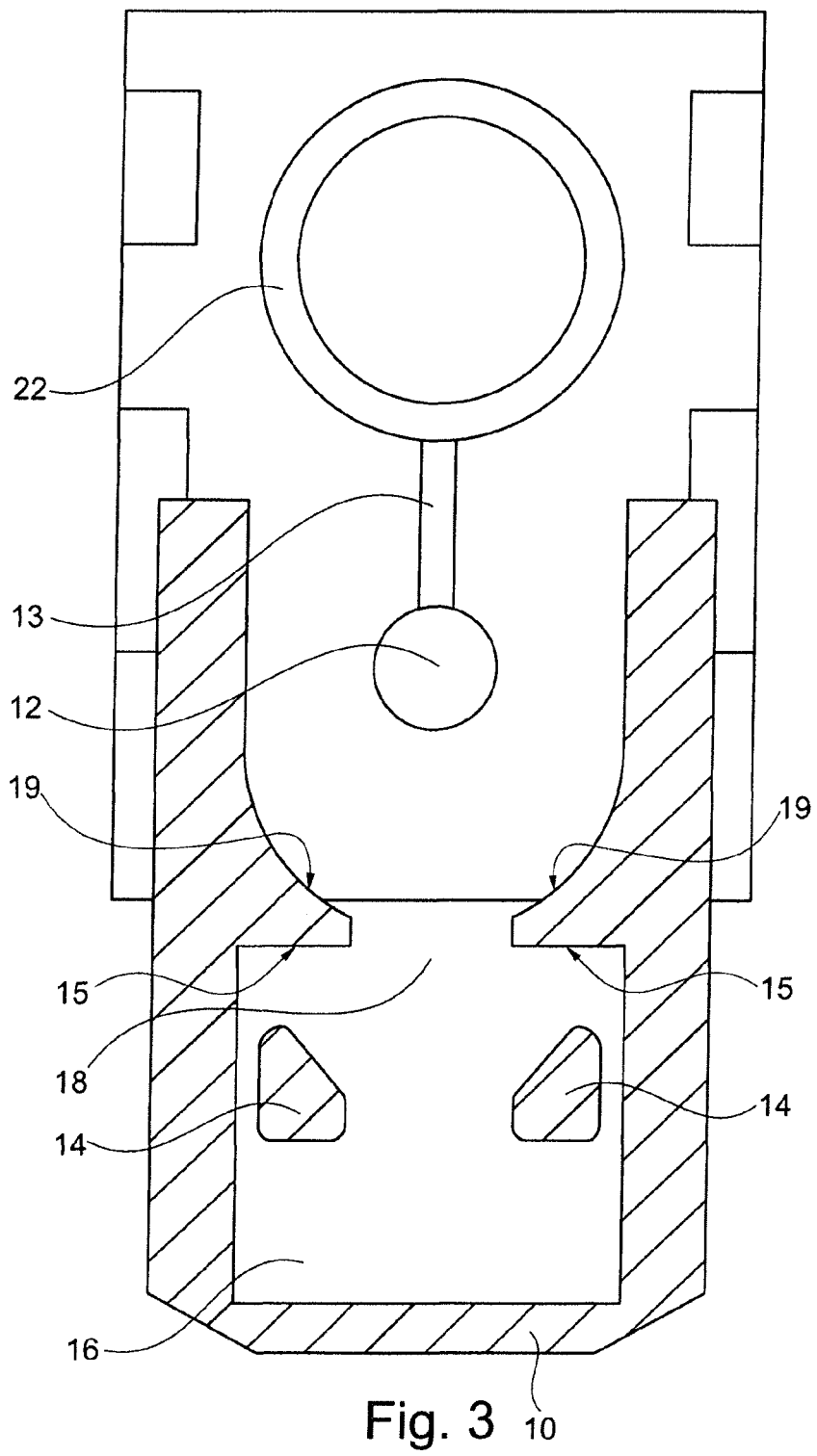
FIG. 3 shows a plan view of a head of a pin of a component of a system according to the invention prior to insertion into the receiving space of a device shown without a spring element.

The system according to the invention comprises a component including a head, typically including a pin and a head arranged at the end of the pin of the component, and a device for holding the head, wherein the device defines a receiving space having an opening via which the head can be inserted into the receiving space from the outside, and a spring element arranged in the receiving space and a path limiter arranged in the receiving space.

For ease of reference, the straight line that connects the geometric center point of the opening to the geometric center point of the receptacle is referred to as a reference line, and the plane that includes the geometric center point of the opening and is perpendicular to the reference line is referred to as the reference plane. In the case of an opening designed symmetrically with respect to a point located in the opening or with respect to a straight line leading through the opening, this point, or the point at which the straight line intersects the plane in which the opening is located, is understood to mean the geometric center point of the opening. If such a point is missing because the opening is not designed to be symmetrical, the geometric center point is the center of the passage area of the opening, or the center of mass of the volume bounded by the walls delimiting the opening is used as the geometric center point of the opening. In some embodiments the receptacle comprises a curved receiving section, and the geometric center point of the receptacle is the center point about which the curved receiving section is curved. In an embodiment of the receptacle comprising a bent receiving section, the center point of the receptacle is a point in which a surface normal with respect to a first section forming the bent receiving section intersects a surface normal with respect to a second section forming the bent receiving section together with the other section. If the receptacle is delimited by a plurality of receiving sections, the geometric center point of the receptacle is the center of the surface area enclosed by the receiving sections.

For ease of reference, the invention is further described in such a way that the opening of the receiving space is arranged at the top relative to the other parts of the receiving space and relative to the spring element, and the head is pushed into the receiving space via the opening from top to bottom. This type of description, however, does not limit the invention to such designs and is provided solely for ease of reference. Of course, conceivable designs also include those in which the opening is arranged on the side of the receiving space and the head is pushed from the side via the opening into the receiving space, or the opening is arranged at the bottom end of the receiving space and the head is pushed via the opening into the receiving space from bottom to top.

The device according to the invention is suitable for holding a head arranged on a component, in some embodiments, at the end of a pin of a component, and the system according to the invention comprises a component including a head, in particular embodiments, a pin and a head arranged at the end of the pin of the component.

The pin provided in some embodiments is, in particular, a part of the component, which has a larger longitudinal extension than width. The pin can be designed to be tapered toward the head, but in certain embodiments has a constant, in specific embodiments circular, elliptical, rectangular, and in particular, square cross section. At least in one direction perpendicular to the longitudinal extension of the pin, and, in particular, in all directions perpendicular to the longitudinal extension of the pin, the head has a width larger than the width of the pin in the transition of the pin to the head. In particular, at least in one direction perpendicular to the longitudinal extension of the pin, and, more particularly, in all directions perpendicular to the longitudinal extension of the pin, the head has a width larger than the largest width of the pin. The head may be spherical or ellipsoidal in shape. However, it can also have the shape of two cones, truncated cones, pyramids or truncated pyramids attached to each other at the respective base thereof. In certain embodiments, the head tapers toward the pin and away from the pin. Tapering away from the pin allows easier insertion of the head into the receptacle. Tapering toward the pin may aid in pulling the head out of the receptacle.

The head can also be formed by a cylinder that is attached to a base plate and extends perpendicularly to the reference line. In some embodiments, the component including the head comprises a base plate that, in a plane parallel to reference lines, pushes behind the receiving space, for example, closes a receiving space that is open on the side. From this base plate, a cylinder forming the head may extend perpendicularly to the reference axis. If the opening on the receiving space is open on one side, namely open toward the base plate, the head, which is fastened to the base plate and is designed as a cylinder, can be pushed through the opening into the receiving space as the base plate is moved. The cross-section of the cylinder can be circular or annular (in the case of a hollow cylinder), and, in particular, circular ring-shaped or elliptical, square, or polygonal. However, it can also have, in the cross section, the shape of two triangles or trapezoids attached to each other on the respective base thereof. In certain embodiments, the head tapers in the direction of the reference line. A taper in the one direction of the reference line allows easier insertion of the head into the receptacle. A taper in the other direction of the reference line can aid in pulling the head out of the receptacle.

The device comprises a receiving space in which a spring element is arranged. The receiving space has an opening via which the head can be inserted into the receiving space from the outside. With the exception of the opening, the receiving space can be designed to be closed in all directions. Also conceivable are embodiments in which the receiving space, with the exception of the opening, is only designed to be closed in all directions in a two-dimensional coordinate system and is designed to be open in one or both directions perpendicular to the two-dimensional coordinate system. An essential role of the receiving space is to hold the spring element in a predefined space and to provide supporting surfaces on which the spring element can be supported when pressure or a tensile force acts on the spring element. In this respect, it may already suffice for the formation of the receiving space if it is formed by supporting surfaces defining the position of the spring element, wherein these supporting surfaces do not necessarily have to transition into one another to form a closed delimiting wall of the receiving space and a discontinuous delimitation of the receiving space in sections can thus also be formed. In certain embodiments, the delimiting walls of the receiving space, even if they have gaps between them, are aligned so as to form at least portions of the sides, in specific embodiments, the entire sides of a rectangle, so that the receiving space has a rectangular design, at least in a two-dimensional coordinate system.

The opening of the receiving space can have a symmetrical design and, for example, can be designed to be circular, elliptical, rectangular, polygonal and, in particular, square.

The spring element used in the device can be a spring element according to the invention, and, in particular, the spring element according to the invention also includes the features described in this section. The spring element used in the device at least comprises a receptacle for the head of the component and, as part of the receptacle, a curved or bent receiving section of a spring arm of the spring element. The curved or bent receiving section has at least one distance point, which is arranged furthest from the reference line in comparison with other points along the extension of the curved or bent receiving section. Furthermore, in relation to the position of the receiving section relative to the reference plane, a blocking section of the spring arm, with respect to which the curved or bent receiving section is designed as a recess, is provided on the spring element, closer to the reference plane than the receiving section.

The receptacle is intended to hold the inserted head. The receptacle comprises the curved or bent receiving section of the spring arm in cooperation with the blocking section of the spring arm, with respect to which the curved or bent receiving section represents a recess in the insertion direction of the head. As a result of the curve or bend of the receiving section leading to the blocking section, a portion of the spring element forms that engages behind the head and prevents the head from being readily pulled out of the receptacle again.

It has been found that this function can already be achieved by a receptacle that comprises only a single curved or bent receiving section. In particular, when the movement of a pin which is provided in some embodiments and at the end of which the head is arranged is guided by a guide so as to take place only in the direction of the longitudinal extension of the pin and to prevent a tilting of the pin, it may be sufficient for holding the head in the receptacle to only engage behind the head only on one side with the curve or bend of the receiving section leading to the blocking section and with the blocking section. Such a one-sided engagement can allow the desired retention of the head up to a force threshold at which the blocking section starts to become elastically deformed, or, in particular, plastically, deformed and makes it possible to pull the head out. In a particular embodiment, however, the spring element comprises two receiving sections, which each form part of the receptacle, at least one of which is curved or bent, and, in certain embodiments, both being curved or bent, and which are typically provided to bear against the head on different sides and, for this purpose, are, in particular, generally designed to be located opposite one another.

The distance point of a curved receiving section is, in particular, the apex of the curved receiving section. In particular, a curved receiving section includes a region in which the radius of the arc is constant. In particular embodiments, the distance point is formed in this region of the arc.

The distance point of a bent receiving section is, in particular, the apex of the bend. The bent receiving section is, in some embodiments, formed by two rectilinear subsections of the receiving section, which extend at an angle with respect to one another and abut one another in the bend.

The blocking section of the spring arm represents the portion of the spring arm that is arranged the furthest in the direction opposite the distance point, that is to say is the section of the spring arm engaging behind the head the most.

With respect to the position thereof relative to the reference plane, the path limiter is arranged closer to the reference plane than the distance point of the receiving section.

With respect to the position of the blocking section relative to the reference plane, a joint section of the spring arm, which allows the receiving section to pivot counter to a restoring force acting in the direction toward a starting position when the receiving section is pivoted, is provided closer to the reference plane than the blocking section, wherein this pivoting of the receiving section allows a portion of the spring arm located between the blocking section and the distance point to bear against the path limiter.

The joint section may be designed so as to define a pivot point about which the curved or bent receiving section pivots (e.g. such that the distance point moves along a circular path about the pivot point). However, for the insertion of the head into the receptacle, a movement component, in which the distance point is moved even further away from the opening of the receiving space than is predefined by the circular path, is in particular added to the movement of the distance point along a circular path. This can be achieved, for example, in that the joint section comprises a first bending section between two sections of the spring element, which are, in particular, designed in a rectilinear manner, and a second bending section, which is connected to the first bending section by way of a section, in particular, in a rectilinear section, of the spring element extending in a longitudinal direction. Additionally or alternatively, this can be achieved in that the joint section is an arc-shaped section of the spring element (wherein the arcuate shape can also be achieved by connecting two bending sections in series), wherein the bend of the arc can become narrower when a force is exerted on one end of the joint section, and thus allows this end of the joint section to move further downward (further away from the opening).

By enabling the receiving section to pivot in such a way that a portion of the spring arm located between the blocking section and the distance point bears against the path limiter, it is possible in a particular embodiment to prevent the distance point from being moved along the path limiter in the direction toward the opening, or to at least make this movement more difficult. Thus, a portion of the spring arm lying further from the opening in comparison with the position of the blocking section is retained, thereby facilitating the elastic or, in particular, plastic deformation of the blocking section, which would be facilitated less if the head were able to push the blocking section easily, and without the same being held back, in the direction toward the opening.

In some embodiments, the receiving space is delimited at least by a base surface arranged at the bottom and by a stopper surface which is arranged at the top and which faces the base surface, wherein the opening adjoins the stopper surface, wherein the spring element is arranged in the receiving space so as to be supported with the base thereof on the base surface in a starting position, and to be supported with the stopper section thereof on the stopper surface, or so that the stopper section is arranged at a distance from the stopper surface but can be brought into contact with the stopper surface when the blocking section is moved in a direction pointing away from the base. In particular, the blocking section is arranged beneath the opening. With the base surface and the stopper surface, the receiving space thus defines the position of the spring element in two opposite directions, either precisely, namely when the spring element rests with the base and stopper section against the base surface or the stopper surface, or at least to a defined region, when the spring element either does not rest with the base against the base surface or does not rest with the stopper section against the stopper surface, and is thus arranged with play in the receiving space.

In certain embodiments, the receiving space is designed to be mirror-symmetrical with respect to a plane, in specific embodiments the plane including the reference line.

In specific embodiments, the receiving space comprises a second stopper surface, which is arranged on the opposite side of the opening with respect to the (first) stopper surface. In such an embodiment, the spring element is, in particular, designed with a second stopper section and a second blocking section and is arranged in the receiving space so as to be supported with the second stopper section thereof on the stopper surface in a starting position or so that the second stopper section is arranged at a distance from the stopper surface but can be brought into contact with the stopper surface when the second blocking section is moved in a direction pointing away from the base, and the second blocking section is arranged beneath the opening.

In some embodiments, a second path limiter is arranged in the receiving space, against which path limiter the second blocking section and/or the second receiving section strikes when the second blocking section has been pivoted out of the starting position against the restoring force by a maximum pivot distance predefined by the position of the second path limiter relative to the starting position of the second blocking section or of the second receiving section.

In particular embodiments, an abutment is arranged outside the receiving space. A portion of the component can bear against this abutment and thus define how deeply the head can be inserted into the receiving space. The position of the abutment relative to a stopper surface in the receiving space determines the position of the spring element in the direction toward the abutment. Additionally, the position of the abutment determines the position of a block of the component intended to bear against the abutment and the position of the head relative to this block. Further, the position of the abutment relative to the stopper surface determines the position of the receptacle relative to a stopper section of the spring element as well. The portion of the receptacle relative to the stopper section makes it possible to fix the position of a spring element in the receiving space when the block rests against the abutment and the head is held in the receptacle of the spring element.

The spring element according to the invention comprises a base with which it can be supported on another component, in particular embodiments, a delimiting surface of the receiving space of the device according to the invention. A receptacle for a head of a component is arranged above the base.

The spring element according to the invention comprises a curved or bent receiving section of a spring arm of the spring element as part of the receptacle. A head being received by the receiving section widens the receiving section. By having a curved or bent receiving section, the receptacle provides space for the head. At the same time, this shaping of the receiving section makes it possible for a head to make contact with the receiving section at least in certain spots. In certain embodiments of the system according to the invention, the receiving section is adapted to the shape of the head or has a curved or bent progression, which allows the head to be clamped, or the receiving section to rest against the head, in a secure, typically form-locked and/or force-fit manner. In particular embodiments, the receiving section is a flat strip section.

In a particular embodiment, the receiving section comprises a section that is circular ring segment-shaped or elliptical ring segment-shaped.

In relation to the position of the receiving section relative to the base, a blocking section of the spring arm, with respect to which the curved or bent receiving section is formed as a recess, is provided on the spring element according to the invention, further away from the base than the receiving section.

In relation to the position of the blocking section relative to the base, a joint section of the spring arm, which allows the receiving section to pivot counter to a restoring force acting in the direction toward a starting position when the receiving section is pivoted, is provided on the spring element according to the invention, further away from the base than the blocking section.

With respect to the position of the blocking section relative to the base, a stopper section of the spring arm is provided on the spring element according to the invention, further away from the base than the blocking section.

In some embodiments, the blocking section directly adjoins the receiving section. When the head is engaged in the receptacle, the blocking section prevents the head from detaching from the receptacle, in particular by a surface which counteracts the movement out of the engaged position.

In particular embodiments, the blocking section is arcuate and curved opposite to the curved or bent receiving section.

In certain embodiments of the spring element according to the invention, the receiving section comprises a section that is circular ring segment-shaped or elliptical ring segment-shaped.

In specific embodiments of the spring element according to the invention, the blocking section is arcuate and curved opposite to the curved or bent receiving section.

In certain embodiments of the spring element according to the invention, in relation to the position of the blocking section relative to the base, a rectilinear insertion section of the spring arm adjoins the blocking section further away than the blocking section. The insertion section can serve as a guide and/or catcher for the head so that the head is guided into the correct position when approaching the receptacle if it is not optimally positioned relative to the receiving section of the spring element. The insertion section is typically rectilinear, and, in particular, a flat strip section. In specific embodiments, slightly arched and/or polygonal and/or curved progressions of the insertion section are used for implementing the function of trapping the head.

In some embodiments of the spring element according to the invention, a leg section of the spring arm pointing upwardly from the base is provided.

In particular embodiments of the spring element according to the invention, a transverse connecting section of the spring arm is provided, which connects the leg section to the rectilinear insertion section.

In certain embodiments of the spring element according to the invention, a curved or bent second receiving section of a second spring arm of the spring element is provided as part of the receptacle, and, in relation to the position of the second receiving section relative to the base, a second blocking section of the second spring arm, with respect to which the curved or bent second receiving section is formed as a recess, is provided further away than the second receiving section. In relation to the position of the second blocking section relative to the base, a second joint section of the second spring arm, which allows the second blocking section to pivot counter to a restoring force acting in the direction toward a starting position when the second blocking section is pivoted, is provided further away than the second blocking section. In relation to the position of the second blocking section relative to the base, a second stopper section of the second spring arm is provided further away than the second blocking section.

The material of the spring element is typically metal. In particular embodiments, the spring element is designed in one piece, for example a flat strip formed by bending. In some embodiments, other materials are used for production, which have sufficient elasticity and strength, in particular plastic or a composite material, such as carbon fiber (CFRP) or glass fiber (GFRP).

In some embodiments, the spring element is compressed before insertion into the receiving part, in particular so as to enable insertion. In particular in the inserted or mounted state of the spring element, preloading typically arises therein, which typically presses sections of the spring element against one or more walls of the receiving part.

In certain embodiments, the receiving part comprises a block, wherein the provided pin is typically connected to the block, and the block, in particular, rests against the abutment. A block can also be understood to mean an arbitrarily shaped contiguous object, which is suitable, in particular, for being clamped or encompassed by a receptacle.

In specific embodiments, the maximum diameter of the head, perpendicular to the reference line, which generally runs through the geometric center point of the receptacle, is greater than the maximum diameter of the receptacle of the spring element in the non-engaged state or when the spring arms are relaxed. In some embodiments, a substantially similar or identical diameter is used. The receiving sections of each spring arm are typically positioned closer to the associated path limiters in the engaged state than in the non-engaged state. Depending on the shape of the receiving section, a relatively small difference in the distance between the receiving sections and the path limiters with regard the two states may already suffice. In a particular embodiment, the receiving section already bears against the path limiter in the engaged state.

In certain embodiments, the path limiters have a cross section shaped in such a way that the path limiters do not come into contact with the spring element on all sides, particularly in a non-engaged state. In such embodiments, the cross section is substantially matched to the receiving space of the spring element. In particular, the path limiters have such a cross section that is substantially complementary to the surrounding free space, which is limited by the spring element. In particular embodiments, the cross section of the path limiters is designed in the form of a trapezoid, or a triangle, or a rectangle. In specific embodiments, the path limiters take the form of arbitrary curves or arcuate cross sections, especially in some sections.

In particular embodiments the receptacle is made of plastic, typically in one piece. In some embodiments, the receptacle is made of metal or a composite material, such as carbon fiber or glass fiber. What applies to the selection of the material applies analogously to the pin described in more detail below.

The system according to the invention comprises a device according to the invention and a component including a head, typically including a pin and a head arranged at the end of the pin of the component, wherein the receiving section of the spring element rests partially against the head. If a pin is provided, the pin typically passes through the opening. In particular embodiments, the system according to the invention comprises a spring element according to the invention.

In some embodiments, the component comprises a block, wherein the provided pin is connected to the block, and the block rests against the abutment of the device according to the invention.

In the method according to the invention for pulling out the head, it is provided that
 a force is applied to the head and has at least one component acting in the direction of the reference line;
 contact of the head with the curved or bent receiving section causes the receiving section to pivot counter to the restoring force so that the portion of the spring arm located between the blocking section and the distance point bears against the path limiter; and
 when the portion of the spring arm located between the blocking section and the distance point bears against the path limiter, elastic or plastic deformation of the spring arm takes place, during which the blocking section is deformed.

The invention is, in particular, used when fastening add-on parts, particularly those made of plastic, to vehicles. For example, the invention may be used for attaching a radiator grille to a frame of a vehicle. The radiator grille is subjected to high pressures when driving at high speeds and must remain stationary even at these speeds. At the same time, the radiator grille is one of those components that come into contact with a pedestrian at an early stage during a head-on collision with the pedestrian and are typically detached from the frame without delay in order to avoid injuries.

FIG. 1 shows a spring element for a device for holding a head 12 (cf. FIGS. 2, 3, 4, 5, 6) of the pin 13 arranged at the end of a pin 13 (cf. FIGS. 2, 3, 4, 5, 6) of a component. The spring element 1 comprises a base 9 for supporting the spring element 1 and a receptacle 2 for the head 13 arranged above the base 9. A curved receiving section 3 of a spring arm of the spring element 1 is provided as part of the receptacle 2. In relation to the position of the receiving section 3 relative to the base 9, a blocking section 4 of the spring arm, with respect to which the implemented receiving section 3 is designed as a recess, is provided above the receiving section 3.

In relation to the position of the blocking section 4 relative to the base 9, a joint section 8 of the spring arm, which allows the receiving section 3 to pivot counter to a restoring force acting in the direction toward a starting position when the receiving section 3 is pivoted, is provided above the blocking section 4. In relation to the position of the blocking section 4 relative to the base 9, a stopper section 6 of the spring arm is provided above the blocking section 4.

The receiving section 3 comprises a section that is elliptical ring segment-shaped. The blocking section 4 is arcuate, wherein it is curved opposite to the curved receiving section 3.

In relation to the position of the blocking section 4 relative to the base 9, a rectilinear insertion section 5 of the spring arm adjoins the blocking section 4 above the blocking section 4.

Furthermore, a leg section 23 of the spring arm pointing upwardly from the base 9 is provided. A transverse connecting section 7 of the spring arm connects the leg section 23 to the rectilinear insertion section 5.

The spring element 1 is designed mirror-symmetrically with respect to the reference line A.

The transition, designed as a bending section, between the insertion section and the transverse connecting section and the transition, designed as a bending section, between the transverse connecting section 7 and the leg section 23 form sections of the joint section 8, which, contribute to the option, provided by the joint section 8, of pivoting the spring arm.

The spring element 1 is typically made of a curved, in particular one-piece, flat strip, metal or plastic or an elastic material.

In FIG. 1, the ends of the receiving sections 3 bear against one another in the non-engaged state and can already be preloaded.

Furthermore, straight lines parallel to the reference line A are drawn in FIG. 1 and make contact with the receiving sections 3 in whose contact point the distance point 21 is located. The distance between the two distance points 21 then corresponds to the diameter of the receptacle 2.

Figure 4:
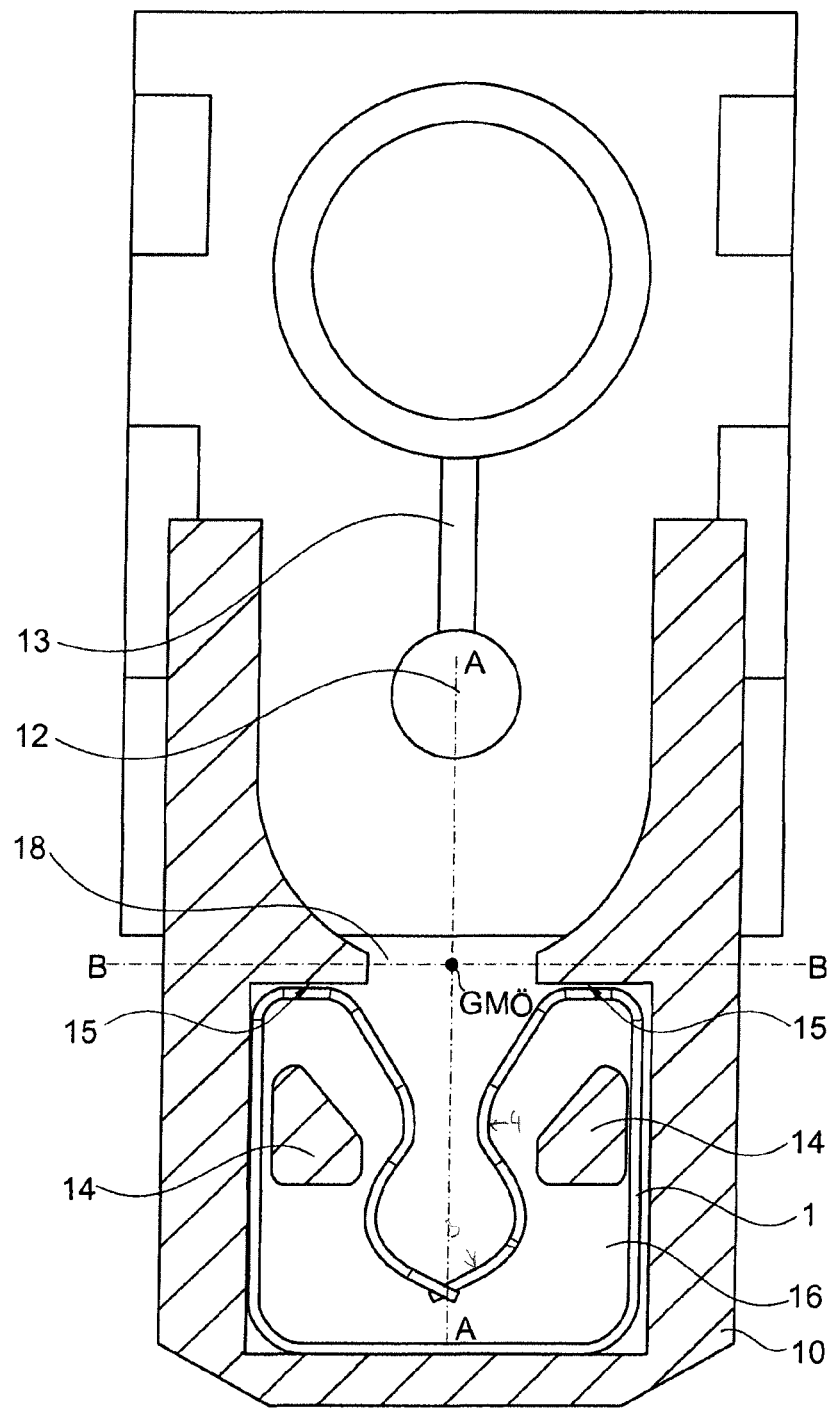
FIG. 4 shows a plan view of a head of a pin of a component of a system according to the invention prior to insertion into the receiving space of a device shown with a spring element.
Figure 5:
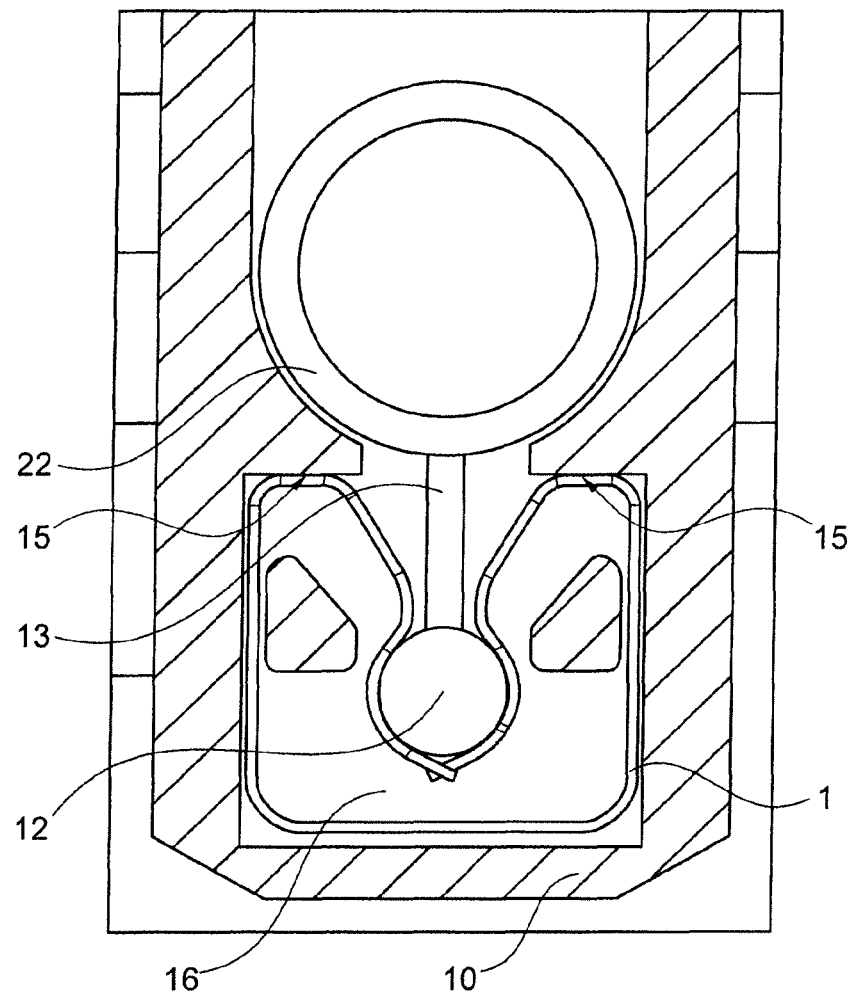
FIG. 5 shows a plan view of a head of a pin of a component of a system according to the invention, which is inserted into the receiving space of a device shown with a spring element.
Figure 6:
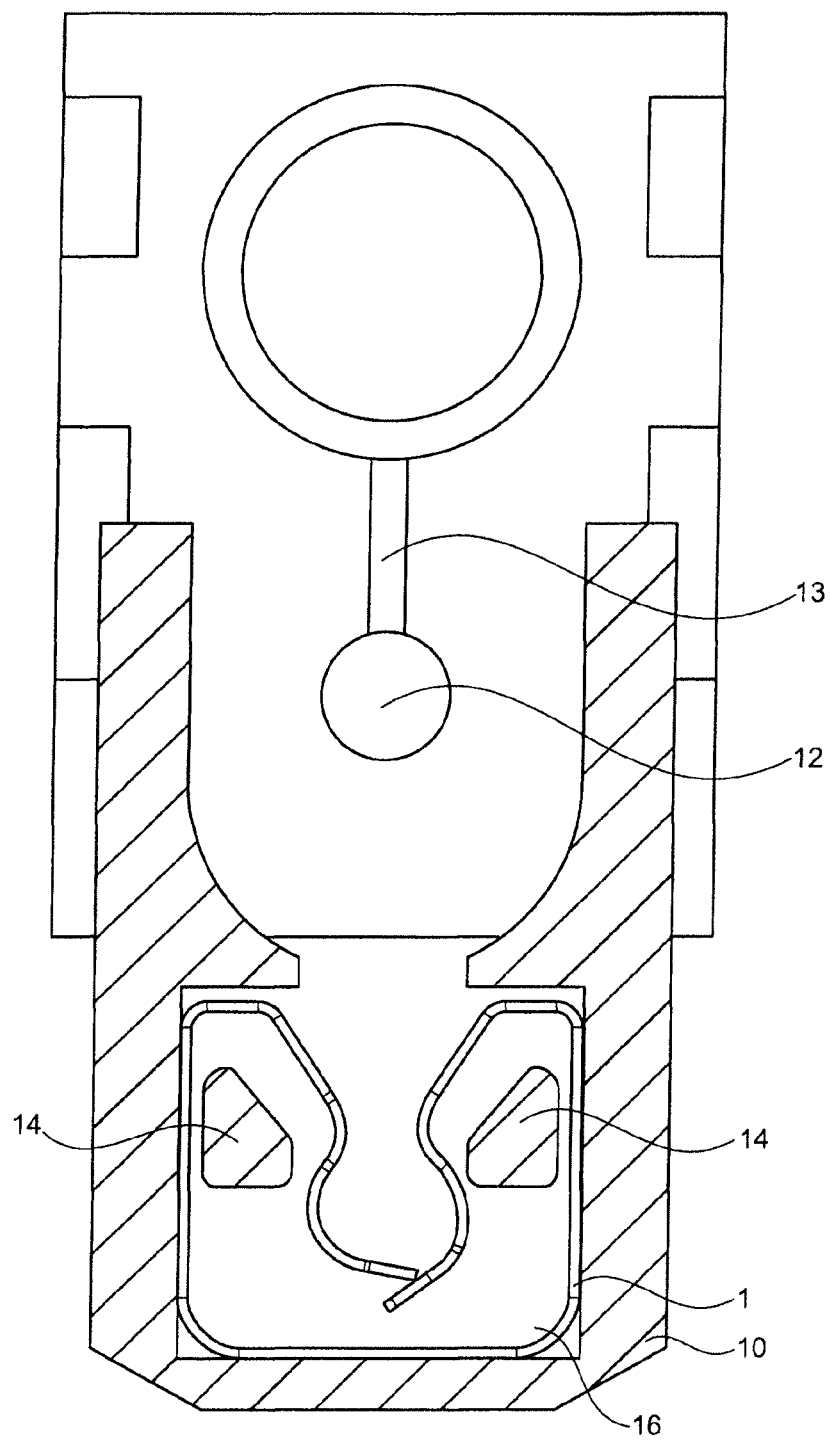
FIG. 6 shows a plan view of a head of a pin of a component of a system according to the invention, which is pulled out of the receiving space of a device shown with a spring element.

The device shown as part of FIGS. 4, 5, 6 for holding a head 12 of a pin 13 arranged at the end of the pin 13 of a component comprises a receiving space 16, which has an opening 18 via which the head 12 of the pin 13 can be inserted into the receiving space 16 from the outside. The spring element 1 is arranged in the receiving space 16. In addition, the receiving space 16 includes a path limiter 14.

The straight line connecting the geometric center point GMÖ of the opening to the geometric center point GMA of the receptacle 2 is referred to as the reference line A. The plane that includes the geometric center point of the opening 18 and is perpendicular to the reference line is referred to as the reference plane B. The receptacle 2 is delimited by two receiving sections so that the geometric center point GMA of the receptacle 2 is the center of the surface area enclosed by the receiving sections.

The distance point 21 is arranged furthest from the reference line A in comparison with other points along the extension of the curved receiving section 3.

With respect to the position thereof relative to the reference plane B, the path limiter 14 is arranged closer to the reference plane B than the distance point 21 of the receiving section 3.

With respect to the position of the blocking section 4 relative to the reference plane B, a joint section 8 of the spring arm 1, which allows the receiving section 3 to pivot counter to a restoring force acting in the direction toward a starting position when the receiving section 3 is pivoted, is provided closer to the reference plane B, wherein this pivoting of the receiving section 3 allows a portion of the spring arm 1 located between the blocking section 4 and the distance point 21 to bear against the path limiter 14.

The receiving space 16 is delimited by a base surface 17 arranged at the bottom and by a stopper surface 15 which is arranged at the top and faces the base surface 17, wherein the opening adjoins the stopper surface 15.

The spring element 1 is arranged in the receiving space 16 so as to be supported, with the base thereof on the base surface 17 in a starting position. The stopper section 6 is arranged at a distance from the stopper surface 15 but can be brought into contact with the stopper surface 15 when the blocking section 4 is moved in the direction pointing away from the base 9.

Furthermore, a second stopper surface 15 is provided, which is arranged on the opposite side of the opening 18 with respect to the first stopper surface 15.

Furthermore, an abutment 19 arranged above the receiving space 16 is provided.

As part of the system, a block 22 is provided on the component, the pin 13 being connected to the block 22. The block 22 rests against the abutment 19 in the position shown in FIGS. 2 and 5.

For pulling out the head 12 of the pin of the system arranged at the end of the pin 13, a force is applied to the pin 13 and has at least one component acting in the direction of the reference line A. Contact of the head 12 with the curved or bent receiving section 3 causes the receiving section 3 to pivot counter to the restoring force so that the portion of the spring arm located between the blocking section 4 and the distance point 21 bears against the path limiter 14. When the portion of the spring arm located between the blocking section 4 and the distance point 21 bears against the path limiter 14, elastic or plastic deformation of the spring arm takes place, during which the blocking section 4 is deformed. FIG. 6 shows the plastically deformed blocking section 4.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "—" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A device for holding a head arranged on a component, said device comprising a receiving space defining an opening, via which the head can be inserted into the receiving space from the outside, and a spring element arranged in the receiving space and a path limiter arranged in the receiving space, wherein:

the spring element including a receptacle for the head of the component, the straight line that connects the geometric center point of the opening to the geometric center point of the receptacle forming a reference line, and the plane that includes the geometric center point of the opening and is perpendicular to the reference line forming a reference plane, a curved or bent receiving section of a spring arm of the spring element is provided as part of the receptacle, the curved or bent receiving section having at least one distance point, which is arranged furthest from the reference line in comparison with other points along the extension of the curved or bent receiving section, in relation to the position of the receiving section relative to the reference plane, a blocking section of the spring arm, with respect to which the curved or bent receiving section is designed as a recess, is closer to the reference plane than the receiving section, the path limiter, with respect to the position thereof relative to the reference plane, is closer to the reference plane than the distance point of the receiving section, and with respect to the position of the blocking section relative to the reference plane, a joint section of the spring arm, which allows the receiving section to pivot counter to a restoring force acting in the direction toward a starting position when the receiving section is pivoted, is closer to the reference plane than the blocking section, wherein pivoting of the receiving section allows a portion of the spring arm located between the blocking section and the distance point to bear against the path limiter, thereby preventing the distance point from being moved along the path limiter in the direction toward the opening.

2. The device according to claim 1, wherein the spring element comprises a base for supporting the spring element, and wherein:

in relation to the position of the receiving section relative to the base, a blocking section of the spring arm, with respect to which the curved or bent receiving section is designed as a recess, is provided further away from the base than the receiving section, in relation to the position of the blocking section relative to the base, a joint section of the spring arm, which allows the receiving section to pivot counter to a restoring force acting in the direction toward a starting position when the receiving section is pivoted, is provided further away from the base than the blocking section, and in relation to the position of the blocking section relative to the base, a stopper section of the spring arm is provided further away from the base than the blocking section.

3. The device according to claim 2, wherein the receiving section comprises a section that is circular ring segment-shaped or elliptical ring segment-shaped.

4. The device according to claim 2, wherein the blocking section is arcuate, wherein it is curved opposite to the curved or bent receiving section.

5. The device according to claim 1, wherein the spring element comprises a base for supporting the spring element, and a receptacle arranged above the base for the head of the component, wherein a curved or bent receiving section of a spring arm of the spring element is provided as part of the receptacle, in relation to the position of the receiving section relative to the base, a blocking section of the spring arm, with respect to which the curved or bent receiving section is designed as a recess, is provided further away from the base than the receiving section, in relation to the position of the blocking section relative to the base, a joint section of the spring arm, which allows the receiving section to pivot counter to a restoring force acting in the direction toward a starting position when the receiving section is pivoted, is provided further away from the base than the blocking section, and in relation to the position of the blocking section relative to the base, a stopper section of the spring arm is provided further away from the base than the blocking section.

6. The device according to claim 5, wherein the receiving space is delimited at least by a base surface arranged at the bottom and by a stopper surface which is arranged at the top and faces the base surface, the opening adjoining the stopper surface, the spring element being arranged in the receiving space so as to be supported with the base thereof on the base surface in a starting position and to be supported with the stopper section thereof on the stopper surface, or so that the stopper section is arranged at a distance from the stopper surface but can be brought into contact with the stopper surface when the blocking section is moved in a direction pointing away from the base.

7. The device according to claim 6, wherein a second stopper surface, which is arranged on the opposite side of the opening with respect to the first stopper surface, the spring element being designed with a second stopper section and a second blocking section, and the spring element being arranged in the receiving space so as to be supported with the second stopper section thereof on the stopper surface in a starting position, or so that the second stopper section is arranged at a distance from the stopper surface but can be brought into contact with the stopper surface when the second blocking section is moved in a direction pointing away from the base, and the second blocking section is arranged beneath the opening.

8. The device according to claim 1, wherein an abutment is arranged outside the receiving space.

9. A system comprising the device according to claim 1, and a component including a head, the receiving section of the spring element resting against the head.

10. The system according to claim 9, wherein an abutment is arranged outside the receiving space of the device, and wherein the component comprises a block, and the block rests against the abutment.

11. A method for pulling out the head, arranged on the component, of the system according to claim 9, said method comprising applying a force to the head, the force having at least one component acting in the direction of the reference line;

wherein contact of the head with the curved or bent receiving section causes the receiving section to pivot counter to the restoring force so that the portion of the spring arm located between the blocking section and the distance point bears against the path limiter; and when the portion of the spring arm located between the blocking section and the distance point bears against the path limiter, elastic or plastic deformation of the spring arm takes place, during which the blocking section is deformed.

* * * * *